United States Patent [19]
Liu

[11] Patent Number: 6,108,758
[45] Date of Patent: Aug. 22, 2000

[54] MULTIPLE MASTERS IN A MEMORY CONTROL SYSTEM

[75] Inventor: Jonathan H. Liu, Folsom, Calif.

[73] Assignee: Intel Corporation, Santa Clara, Calif.

[21] Appl. No.: 08/921,194

[22] Filed: Aug. 29, 1997

[51] Int. Cl.⁷ ................................................. G06F 13/16
[52] U.S. Cl. ........................................... 711/167; 711/105
[58] Field of Search ................................... 711/104, 105, 711/147, 150, 167

[56] References Cited

U.S. PATENT DOCUMENTS

| | | | |
|---|---|---|---|
| 5,369,617 | 11/1994 | Munson | 365/219 |
| 5,390,308 | 2/1995 | Ware et al. | 711/5 |
| 5,799,209 | 8/1998 | Chatter | 395/876 |

OTHER PUBLICATIONS

Frederick A. Ware, "Rambus Memory Controller", Rambus Inc. documentation, Oct. 15, 1996, pp. 1–20.

"64–Megabit Rambus DRAM Technology Directions", Rambus Inc. documentation, Sep. 10, 1995, pp. 3–24.

"Rambus Memory: Enabling Technology for PC Graphics", Rambus Inc. documentation, Oct. 1994, pp. 1–15.

"Rambus Memory: Multi–Gigabytes/Second And Minimum System Cost", Rambus Inc. documentation, 4 pages.

"Rambus Graphics Roadmap", Rambus Inc. documentation, pp. 1–4.

*Primary Examiner*—Eddie P. Chan
*Assistant Examiner*—Kevin L. Ellis
*Attorney, Agent, or Firm*—Blakely, Sokoloff, Taylor & Zafman LLP

[57] ABSTRACT

A method and apparatus for multiple masters for a memory control system is provided. The memory control system includes a first master, and a memory coupled to the first master using a memory channel. A second master is coupled between the first master and the memory. The second master writes to and reads from the memory using a transmission reflection from the first master.

16 Claims, 3 Drawing Sheets

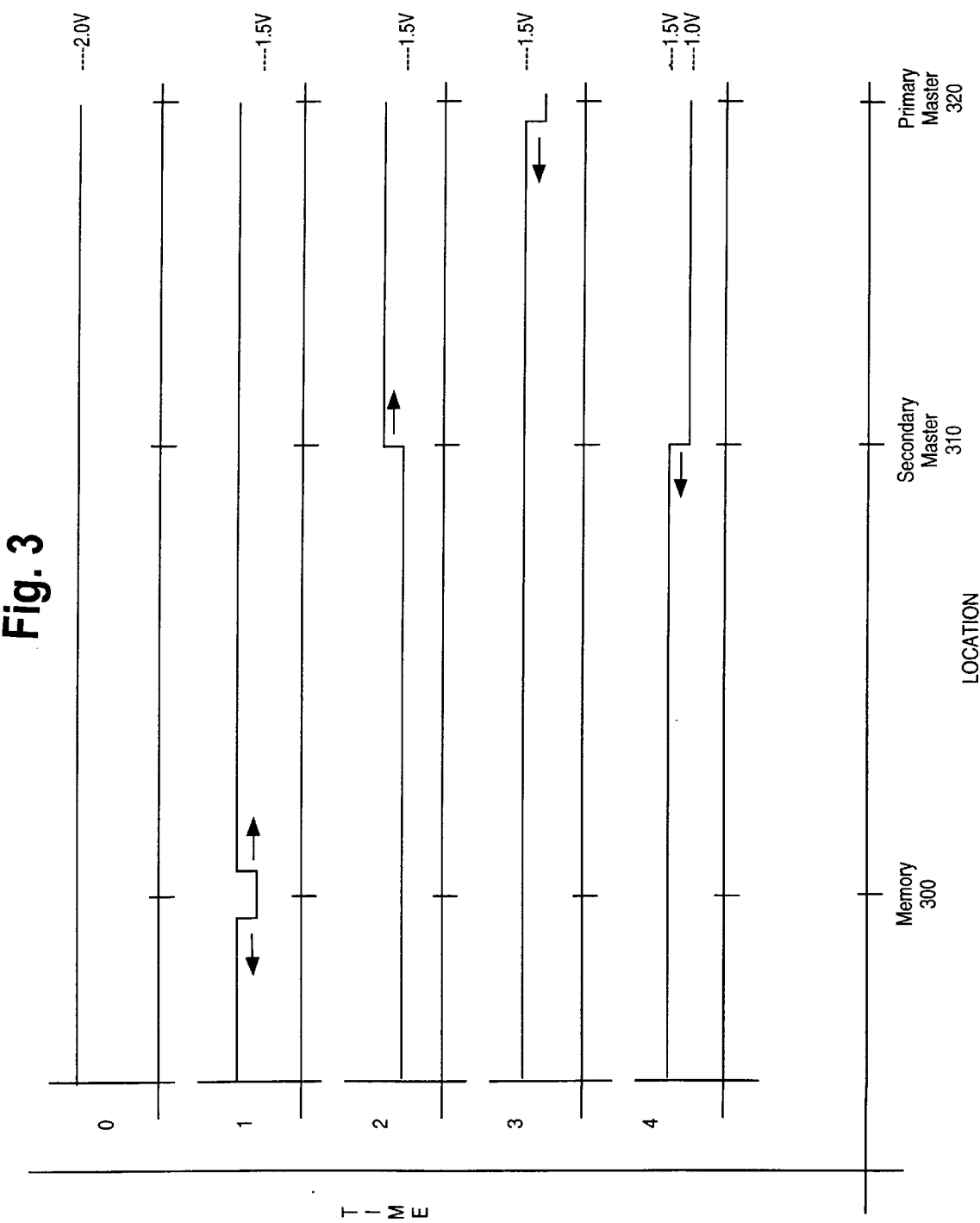

MULTIPLE MASTERS IN A MEMORY CONTROL SYSTEM

FIELD OF THE INVENTION

The present invention relates to memory control systems, and more specifically, to multiple masters in a memory control system.

BACKGROUND OF THE INVENTION

Memory control systems read from memory and write to memory. FIG. 1 illustrates a block diagram of a prior art configuration of a memory control system. A master 110 reads and writes to memory modules 150. The master 110 includes an input/output cell (IOC) 115. The IOC 115 permits the master 110 to interact with the IOCs 155a–155n of the memory modules 150a–150n, respectively. A memory channel 160 connects the IOC 115 of the master 110 with the IOCs 155a–155n of memory modules 150a–150n, respectively. The master 110 and memory modules 150a–150n on the memory channel 160 use a source synchronous scheme to send and receive data, in which common timing signals are used by the master 110 and memory modules 150a–150n for data transfer.

Memory access is made according to clock 180. The clock 180 provides a clock signal to each of the memory modules 150a–150n and to the master 110. This clock signal is the Clock-To-Master (CTM) signal 170. Furthermore, the master 110 returns a Clock-From-Master (CFM) signal 175. The CTM 170 and CFM 175 signals are short circuited together in the master 110. Thus, the CTM 170 and CFM 175 signals appear identical to the master 110.

The last memory module 150n is coupled to terminating resistors 195. The terminating resistors 195 prevent reflection of the transmission signals. The terminating resistors 195 are coupled between a termination voltage source $V_t$ 190 and the last memory module 150n. A termination resistor is further coupled to the CFM 175 signal, terminating the CFM 175 signal. Because of the high speed communication between the master 110 and the memory modules 150a–150n, every transmission line is terminated using a terminating resistor 195.

When the master 110 drives a data signal to write to one of the memory modules 150a–150n, the master 110 delivers a full swing signal on the memory channel 160. Upon arrival at the terminating resistors 195, the signal is fully terminated. When one of the memory modules 150a–150n drives a signal to the master 110, the signal is only pulled to half of its nominal voltage swing because the impedance seen by the memory module 150a–150n is half of the channel load impedance. When the signal reaches the master 110, the signal doubles in amplitude because of the open transmission line. Therefore, the master 110 can detect a full swing signal.

Adding a second master 230 that can also read from and write to memory into a memory control system is advantageous. However, placing a second master 230 into the above described system is difficult. The signal from the memory module 150a–150n is at half-strength until the signal is reflected by the open transmission line of the master 110. Thus, it is difficult to configure the second master 230 to read from memory.

BRIEF SUMMARY OF THE INVENTION

A multiple master memory control system is described. The memory control system includes a first master, a second master 230, and a memory coupled together using a memory channel. The second master 230 is coupled to the first master and the memory. The second master 230 accesses the memory bank by using a transmission reflection from the first master.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 illustrates signal swing for reading data from the memory.

DETAILED DESCRIPTION

The use of multiple masters in a memory control system is described. In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid obscuring the present invention.

The present invention provides a memory control system that permits the insertion of a second master 230 between a first master and memory. The second master 230 is placed sufficiently closely to the first master to avoid frequency degradation.

Figure 1:
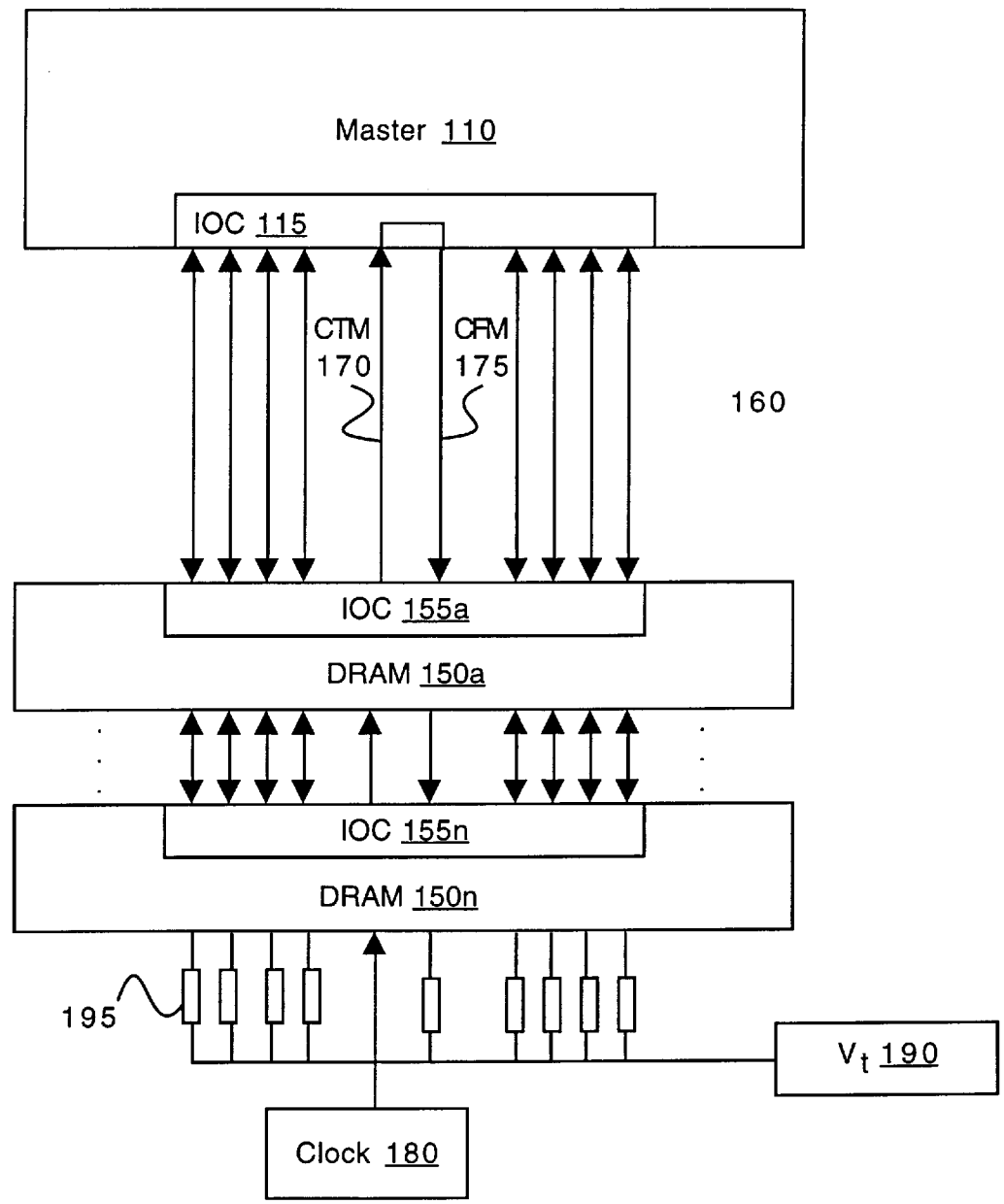
FIG. 1 illustrates a block diagram of a prior art configuration of a memory control system.
Figure 2:
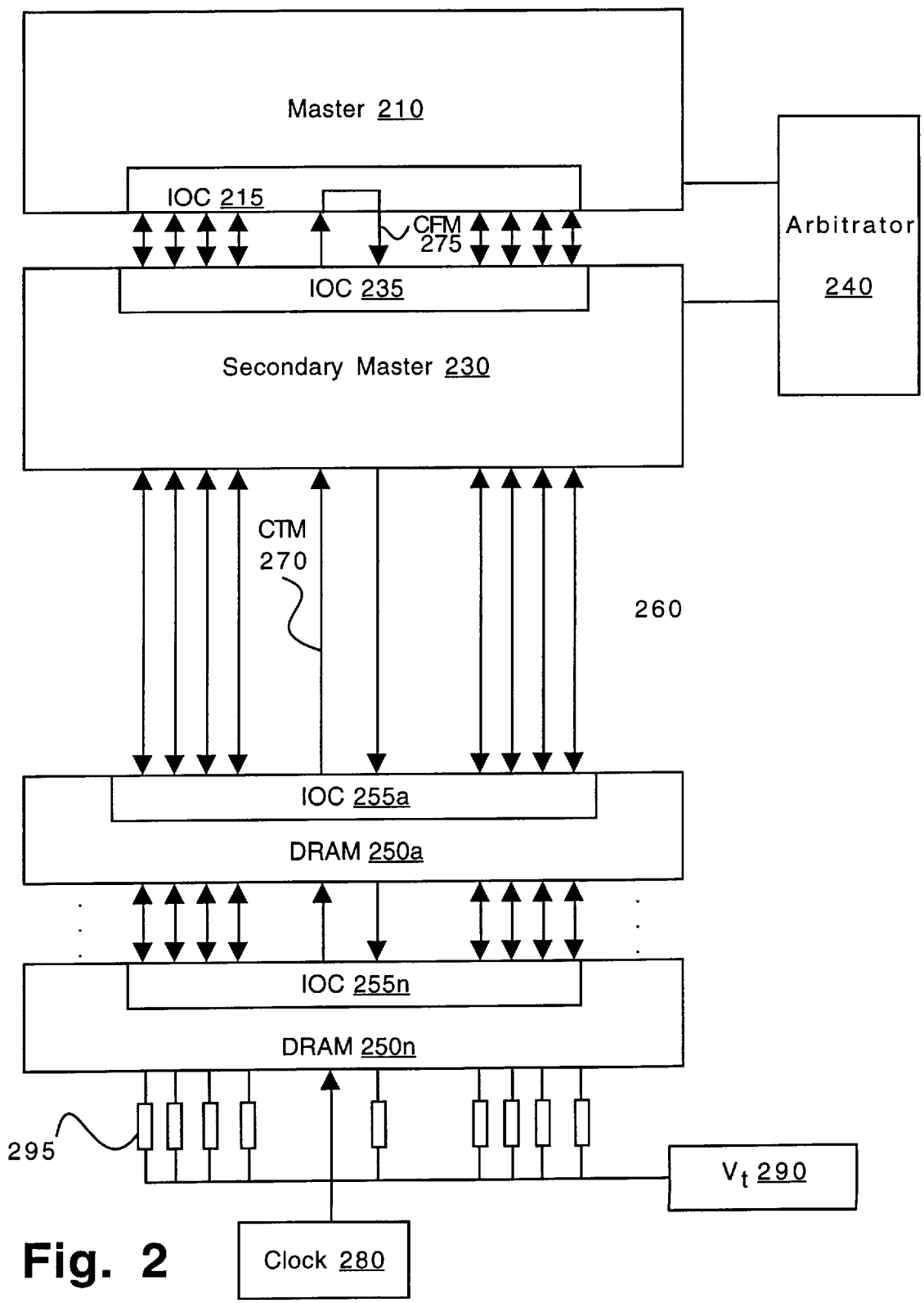
FIG. 2 illustrates a block diagram of the memory control system configuration of the present invention.

FIG. 2 illustrates a block diagram of the memory control system configuration of the present invention. The first, or primary, master 210 reads from and writes to memory blocks 250a–250n. The first master 210 includes an input/output cell (IOC) 215 for receiving input and output signals. The IOC 215 permits the first master 210 to interact with the IOCs 255a–255n of the memory modules 250a–250n, respectively. In one embodiment, the IOC is an application specific integrated circuit (ASIC). The first master 210 controls reading from and writing to memory modules 250a–250n. In one embodiment, memory modules 250a–250n are dynamic random access memory (DRAM). In one embodiment, the DRAM modules 250a–250n are 16/18 MBit (2M×8/9) RDRAM designed by Rambus Corporation, of Mountain View, Calif. Although only two memory modules 250a–250n are illustrated, any number of memory modules 250a–250n may be included in the memory control system. A memory channel 260 couples the IOC 215 of the first master 210 with the IOCs 255a–255n of memory modules 150a–150n.

Memory is accessed according to clock 280. The clock 280 provides a clock signal to each of the memory modules 250a–250n and to the first master 210. This clock signal is the Clock-To-Master (CTM) signal 270. Furthermore, the first master 210 returns a Clock-From-Master (CFM) signal 275. The CTM 270 and CFM 275 signals are short circuited together in the first master 210. Thus, the CTM 270 and CFM 275 signals appear identical to the first master 210.

The memory modules 250a–250n are coupled together using the memory channel 260. Memory channel 260 communication uses a source synchronous scheme to send and receive data. The source synchronous scheme uses the clock signal generated by clock 280 to coordinate data transfers. The memory channel 260 is also coupled to terminating resistors 295 after the last memory module 250n. The terminating resistors 295 prevent reflection of the transmission signals. The terminating resistors 295 are coupled between a termination voltage source $V_t$ 290 and the last memory module 250n. A termination resistor 295 is further coupled to the CFM 275 signal line, terminating the CFM signal 275. In one embodiment, because of the high speed communication between the first master 210 and the memory modules 250a–250n, every transmission line is terminated using a terminating resistor 295.

A second master 230 is coupled between the first master 210 and the memory modules 250a–250n. The second master 230 acts similarly to the first master 210. The second master 230 also includes an IOC 235. The IOC 235 of the second master 230 faces the IOC 210 of the first master 210. This minimizes the distance between the IOC 215 of the first master 210 and the IOC 235 of the second master 230.

In operation, the first master 210 drives a signal to memory modules 250a–250n in order to write to the memory 250a–250n. The first master 210 delivers a full swing signal to the memory module 250a–250n on the memory channel 260. Upon arrival at the terminating resistors 295, the signal is fully terminated. When a memory module 250a–250n drives a signal to the first master 210, the signal is only pulled to half of its nominal voltage swing because the impedance seen by the memory module 250a–250n is half of the channel load impedance. When the signal reaches the first master 210, the signal increases in amplitude because of the open transmission line. In one embodiment, the signal doubles in amplitude. Therefore the first master 210 can detect a full swing signal. The master uses the CTM signal 270 to read the data sent by the memory module 250a–250n.

In contrast, the second master 230 does not read data from the memory using the CTM signal 270 as a strobe. The data sent by the memory module 250a–250n is half swing when it reaches the second master 230 from the memory module 250a–250n with the CTM signal 270. The second master 230 uses the CFM signal 275 as a strobe to read the reflected data bounced back from the first master 210, acting as an open transmission line. The reflected data is full swing.

In one embodiment, the second master 230 uses the CTM signal 270 as a strobe to send data to memory module 250a–250n. Because of the additional loading between the two masters, using CFM signal 275 as strobe causes the data to arrive after the clock edge of the CFM signal 270. Therefore, the CTM signal 270 is used to write data to memory module 250a–250n.

The second master 230 is placed as close to the first master 210 as possible. Such placement reduces the flight time between the first master 210 and the second master 230, and minimizes the performance degradation caused by the additional load. In one embodiment, the flight time between the first master 210 and second master 230 is less than 150 pico-seconds. In one embodiment, the approximate flight time on the memory channel 260 is 200 pico-seconds/inch. Therefore, the distance between the first master 210 and second master 230 is less than ¾ inch, in one embodiment. In one embodiment, the signal edge rate is 300 pico-seconds. Therefore, the flight time is less than the edge rate.

The memory control system further includes an arbitrator 240. The arbitrator 240 is for arbitrating access to the memory channel 260 between the first master 210 and the second master 230. Since both the first master 210 and the second master 230 use the memory channel 260 to read from and write to the memory modules 250a–250n, the arbitrator 240 has to determine which of them has access to the memory channel 260 and the memory modules 250a–250n. In one embodiment, the arbitrator 240 provides the memory channel 260 to the higher priority memory request. Alternatively, the arbitrator 240 may implement any other arbitration mechanism. In one embodiment, the arbitrator 240 may be incorporated into the first master 210 and/or the second master 230. In an alternate embodiment, the arbitrator 240 may be implemented on a separate integrated circuit. In a third embodiment, the arbitrator 240, first master 210, and second master 230 may be implemented on a single integrated circuit.

FIG. 3 illustrates the signal levels for reading from the memory module 250a as a function of time. The X axis represents the location of the signal with respect to the memory module 300, second master 310, and first master 320. The Y axis represents time. For each time unit, e.g., 0–4, a data signal is illustrated. For the present example, the full signal swing is illustrated as one volt (1V), while the idle is maintained at 2V. However, it is to be understood that different voltage levels may be used without changing the present invention.

At time 0, when the channel is idle, the $V_t$ maintains a 2V voltage on the channel.

At time 1, the memory 300 starts to write a data signal on the channel. The half-swing signal is at 1.5 V, as an example, and the signal is traveling in both directions away from the originating memory 300. The termination resistors are not shown.

At time 2, the signal sent by the memory 300 arrives at the second master 310. The signal is still half-swing, at 1.5V, which is too low for the second master 310 to read. Therefore, the signal is simply passed through by the second master 310.

At time 3, the signal reaches the first master 320, which is at the end of the channel. Because the channel ends, the signal is reflected, and thereby doubled. The reflected signal, traveling backwards, is a full swing 1V signal.

At time 4, the reflected doubled signal reaches the second master 310. At this time the signal is full swing 1V signal, and therefore, the second master 310 is able to read the signal. Note that the reflected doubled signal arrives with clock-from-master (CFM) signal 275.

The second master 230 writes to the memory as well. Because the flight time between the first master 210 and the second master 230 is less than the signal edge rate, the traces coupling the two masters do not act as transmission lines. Instead, the traces appear to the second master 230 as additional capacitive loading on the channel. Therefore, the second master 230 sees a full impedance channel and delivers a full swing signal to the memory on the channel.

The method of the present invention also enables the two masters to communicate. The first master 210 can drive a full strength signal to the second master 230. The second master 230, can drive a half-strength signal to the master 210, which the first master 210 can read. The present method does not require any changes to the first master or the memory.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. The present invention should not be construed as limited by such embodiments and examples, but rather construed according to the following claims.

What is claimed is:

1. A memory control system comprising:

a first master;

a memory coupled to the first master by a memory channel;

a second master positioned between the first master and the memory, and coupled to the first master and the memory by the memory channel, the second master accessing the memory using a transmission reflection from the first master, the second master reflecting memory access requests off the first master to the memory and receiving data sent by the memory by reading the data after the data has been reflected by the first master.

2. The memory control system of claim 1, wherein the memory channel is a Rambus Channel.

3. The memory control system of claim 1, wherein the memory comprises a plurality of Rambus dynamic random access memories (RDRAM).

4. The memory control system of claim 1, wherein the memory channel between the second master and the first master is sufficiently short such that a flight time of a signal between the first master and the second master is less than an edge rate of the signal.

5. The memory control system of claim 4, wherein the second master is placed on the memory channel within three-quarters of an inch of the first master.

6. The memory control system of claim 4, further comprising:

an arbitrator coupled to the first master and the second master designed to arbitrate access to the memory channel.

7. The memory control system of claim 1, wherein:

the first master has a first master input/output cell (IOC);

the memory has a memory IOC; and the second master has a second master IOC.

8. The memory control system of claim 7, wherein:

the first master, the second master, and the memory communicate using respective IOCs.

9. The memory control system of claim 8, wherein each IOC is an application specific integrated circuit (ASIC).

10. The memory control system of claim 1, further comprising:

a clock to generate a first clock signal, designated clock-to-master, the first clock signal coupled to the memory, the second master, and the first master.

11. The memory control system of claim 10, further including a second clock signal line coupled to the memory, the second master, and the first master, the second clock signal line designated clock-from-master, the second clock signal line short circuited with the first clock signal in the first master.

12. The memory control system of claim 11, wherein the second master times access to the memory on the clock-from-master signal.

13. The memory control system of claim 12, further comprising a termination register coupled to terminate the clock-from-master signal.

14. The memory control system of claim 11, further comprising:

termination resistors coupled to the memory to terminate the transmission reflection from the first master.

15. The memory control system of claim 14, further comprising a voltage supply coupled to the termination resistors to terminate the transmission reflection from the clock-from-master signal and the first master.

16. A memory control system comprising:

a first master;

a memory coupled to the first master by a memory channel;

a second master coupled between the first master and the memory by the memory channel, the memory channel between the second master and the first master sufficiently short such that a flight time of a signal between the first master and the second master is less than an edge rate of the signal; and a clock designed to generate a clock-to-master signal coupled to the memory, the first master, and the second master; and the first master returning a clock-from-master signal, the clock-from-master signal and the clock-to-master signal short circuited in the first master;

wherein the second master uses a transmission reflection from the first master to read from the memory, such that the second master reflects memory access requests off the first master to the memory, and the second master reads data sent by the memory after the data has been reflected by the first master.

* * * * *